US009894211B1

(12) United States Patent
Smith et al.

(10) Patent No.: US 9,894,211 B1
(45) Date of Patent: Feb. 13, 2018

(54) TECHNIQUES FOR ENHANCED CALL ROUTING FOR GROUPS

(71) Applicant: Republic Wireless, Inc., Raleigh, NC (US)

(72) Inventors: Brandon Smith, Cary, NC (US); Adam Cook, Apex, NC (US)

(73) Assignee: Republic Wireless, Inc., Raleigh, NC (US)

( * ) Notice: Subject to any disclaimer, the term of this patent is extended or adjusted under 35 U.S.C. 154(b) by 0 days.

(21) Appl. No.: 15/641,399

(22) Filed: Jul. 5, 2017

(51) Int. Cl.
*H04M 3/42* (2006.01)
*H04M 3/56* (2006.01)
*H04M 1/725* (2006.01)
*H04M 7/00* (2006.01)

(52) U.S. Cl.
CPC ....... *H04M 3/563* (2013.01); *H04M 1/72597* (2013.01); *H04M 3/42059* (2013.01); *H04M 7/003* (2013.01); *H04M 2201/42* (2013.01); *H04M 2203/5018* (2013.01); *H04M 2207/18* (2013.01); *H04M 2242/14* (2013.01); *H04M 2242/28* (2013.01); *H04M 2250/62* (2013.01)

(58) Field of Classification Search
CPC ... H04W 4/16; H04M 3/563; H04M 1/72597; H04M 3/42059; H04M 7/033
See application file for complete search history.

(56) References Cited

U.S. PATENT DOCUMENTS

| | | | | |
|---|---|---|---|---|
| 5,608,782 A * | 3/1997 | Carlsen | ............ | H04M 3/42229 379/88.12 |
| 5,911,120 A * | 6/1999 | Jarett | ................... | H04W 76/02 370/335 |
| 6,505,040 B1 * | 1/2003 | Kim | ..................... | H04L 12/1818 370/260 |
| 6,782,413 B1 * | 8/2004 | Loveland | ............ | H04L 12/4625 379/120 |
| 6,839,417 B2 * | 1/2005 | Weisman | .......... | H04M 3/42008 379/204.01 |
| 6,870,916 B2 * | 3/2005 | Henrikson | ............ | H04M 3/567 379/158 |
| 6,993,355 B1 * | 1/2006 | Pershan | .............. | H04L 12/1818 370/352 |
| 7,363,030 B2 * | 4/2008 | Chang | ................. | H04M 3/2218 379/202.01 |
| 7,526,281 B2 * | 4/2009 | Khartabil | ................ | H04M 3/56 455/413 |
| 7,542,558 B2 * | 6/2009 | Klein | ................ | H04M 3/42374 379/201.01 |
| 7,602,893 B2 * | 10/2009 | Bhatia | .................. | G06Q 10/109 370/260 |

(Continued)

*Primary Examiner* — Steve D'Agosta
(74) *Attorney, Agent, or Firm* — Gregory Stephens

(57) ABSTRACT

Various embodiments are directed to techniques for enhanced call routing for groups. Some embodiments are particularly directed to a connection manager that can identify one or more secondary telephony endpoints to invite to join a call based on one or more routing policies. One or more embodiments described herein may include a connection manager that provides customizable extension capabilities to a wireless cellular phone. The systems, devices, and methods described herein may be embodied in and performed by communication devices, telecommunications servers, and other devices, and software instructions executed by some or all of such devices.

12 Claims, 11 Drawing Sheets

(56) References Cited

U.S. PATENT DOCUMENTS

| | | | | |
|---|---|---|---|---|
| 7,676,033 | B2* | 3/2010 | Madhusudan | H04M 3/56 379/202.01 |
| 7,801,953 | B1* | 9/2010 | Denman | H04W 4/10 370/260 |
| 7,865,180 | B2* | 1/2011 | Davis | H04M 3/56 455/416 |
| 8,208,955 | B1* | 6/2012 | Nelson | H04M 1/2535 379/208.01 |
| 8,600,391 | B2* | 12/2013 | Vendrow | 370/351 |
| 2003/0224808 | A1* | 12/2003 | Bonta | H04W 84/18 455/463 |
| 2005/0220069 | A1* | 10/2005 | Li | H04L 45/306 370/349 |
| 2008/0155126 | A1* | 6/2008 | Swain | H04L 12/403 709/251 |
| 2010/0020955 | A1* | 1/2010 | Wengrovitz | H04M 3/568 379/202.01 |

* cited by examiner

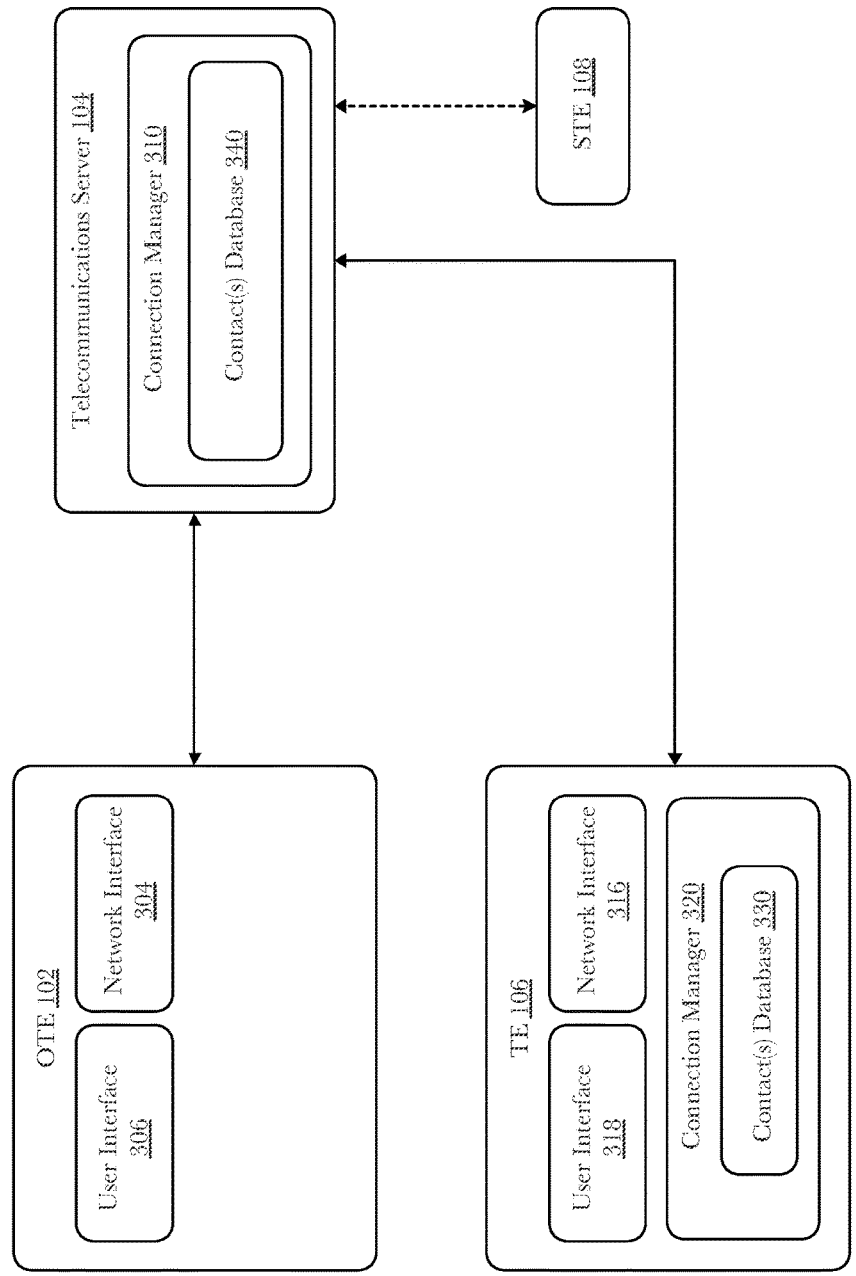

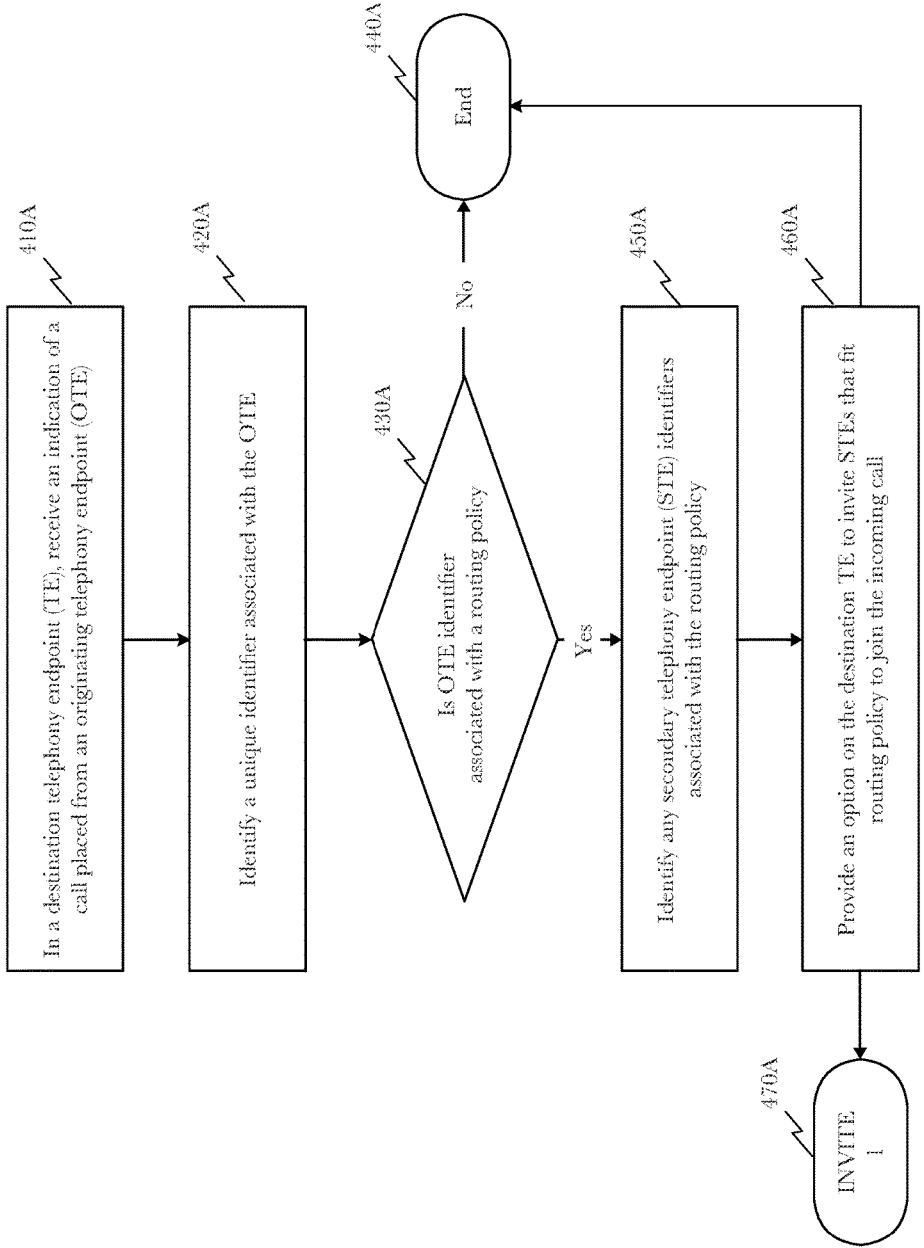

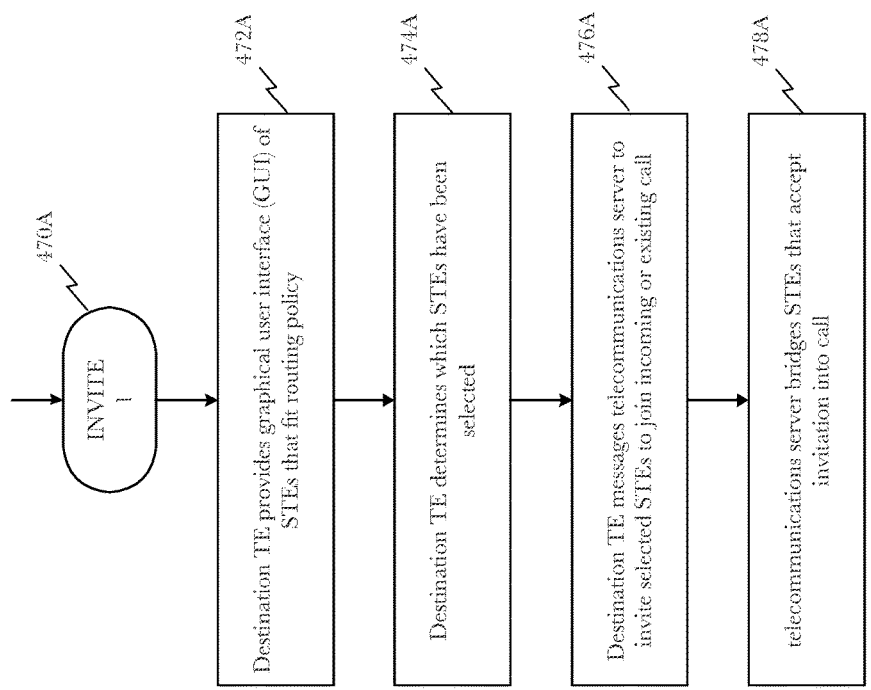

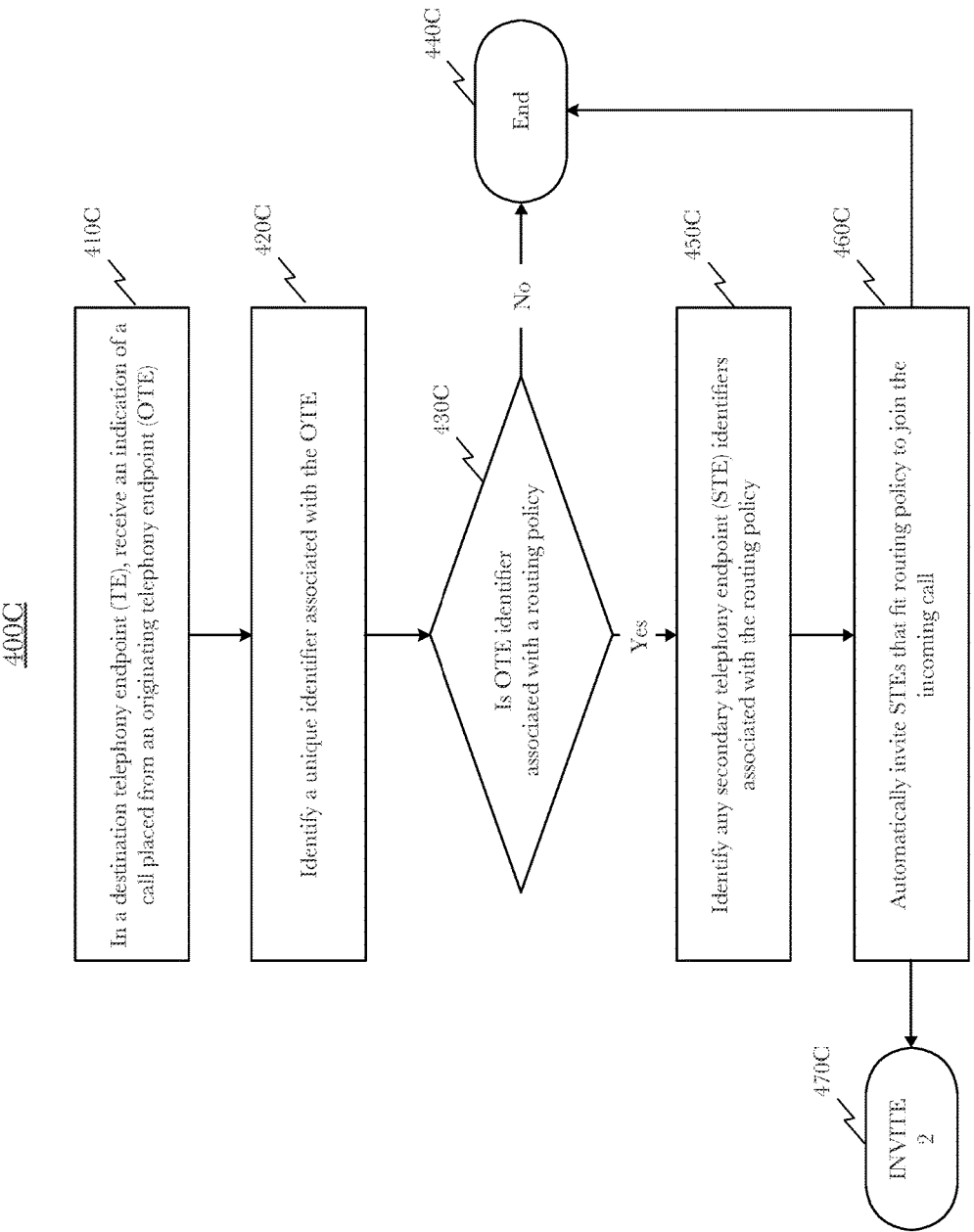

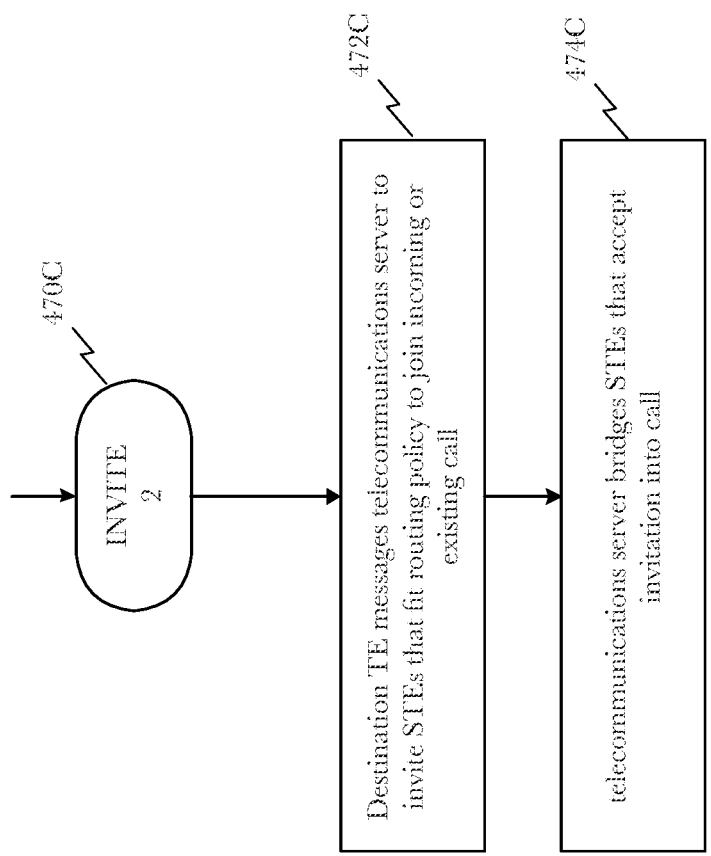

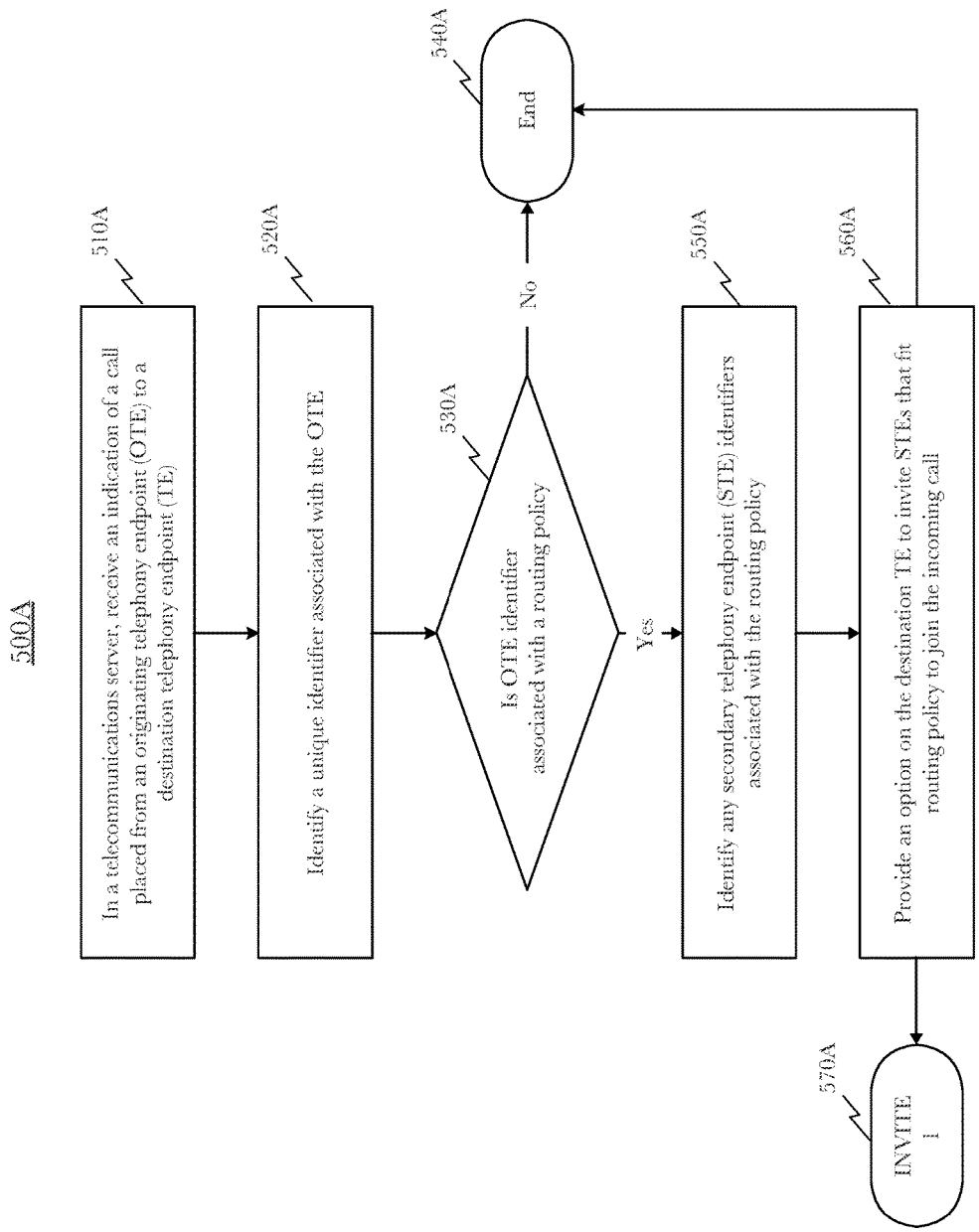

FIG. 5B
500B

510B: In a telecommunications server, receive an indication of a call placed from an originating telephony endpoint (OTE) to a destination telephony endpoint (TE)

↓

520B: Identify a unique identifier associated with the OTE

↓

530B: Is OTE identifier associated with a routing policy?

- No → 540B: End
- Yes ↓

550B: Identify any secondary telephony endpoint (STE) identifiers associated with the routing policy

↓

560B: Automatically invite STEs that fit routing policy to join the incoming call

↓

570B: INVITE 2

600

800

TECHNIQUES FOR ENHANCED CALL ROUTING FOR GROUPS

BACKGROUND

Mobile telecommunication devices or telephony endpoints utilizing wireless communication protocols are ubiquitous. Many of these devices utilize one of the competing circuit-switched or Internet Protocol (IP) cellular networks (e.g., GSM or CDMA) to place and receive telephone calls to other telephony endpoint devices. Typically, a telephony endpoint device may communicate with one or more other mobile telephony devices on the same or another circuit-switched or IP cellular network, a Voice-over-IP (VoIP) telephony device operable over an IP network such as the Internet, and/or a plain old telephone service (POTS) telephony device operable over the public switched telephone network (PSTN). Each of these telephony endpoint devices may use a different access network but may all be interfaced at some point to allow for communication among the different networks.

There has been a significant and ongoing migration away from circuit-switched legacy wireline telephony to a reliance on mobile wireless telephony service. This so called "cord-cutting" has led to a shift in the manner telephony services are consumed. For instance, the concept of multiple telephones sharing the same telephone number when connected to the same circuit-switched endpoint does not have an analog in the mobile wireless service model. Thus, two or more people on one end of a telephone call cannot easily participate in the telephone call with the party(s) on the other end because there are no 'extension' phones connected to the same line.

What is needed is a technique to easily allow the intended recipient of a telephone call to bridge other secondary telephony endpoints into the call.

BRIEF DESCRIPTION OF THE DRAWINGS

FIG. 3 illustrates an embodiment of a second operating environment.

FIG. 4A illustrates an embodiment of a first logic flow.
FIG. 4B illustrates an embodiment of a second logic flow.
FIG. 4C illustrates an embodiment of a third logic flow.
FIG. 4D illustrates an embodiment of a fourth logic flow.
FIG. 5A illustrates an embodiment of a fifth logic flow.
FIG. 5B illustrates an embodiment of a sixth logic flow.

DETAILED DESCRIPTION

Figure 1:
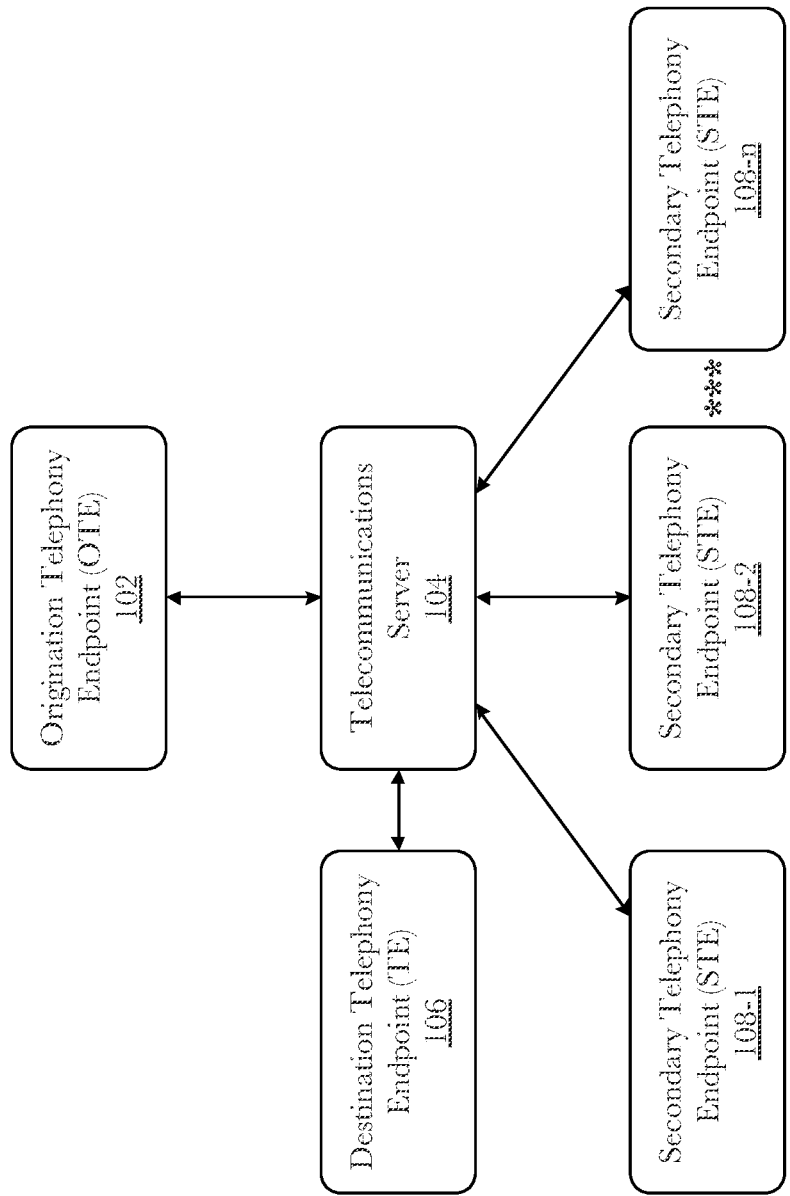
FIG. 1 illustrates an embodiment of a first operating environment.

Various embodiments are directed to techniques for enhanced call routing for groups. Some embodiments are particularly directed to a connection manager that can identify one or more secondary telephony endpoints (STEs) to invite to join a call based on one or more contextual based routing policies. One or more embodiments described herein may include a connection manager that provides customizable extension capabilities to a mobile communications device. The systems, devices, and methods described herein may be embodied in and performed by communication devices, telecommunications servers, and other computer devices, and software instructions executed by some or all of such devices, as will be explained in detail below.

In one embodiment, for example, an apparatus may include a memory and logic, at least a portion of the logic implemented in circuitry coupled to the memory. In one or more such embodiments, the logic may receive an indication of a call from an origination telephony endpoint (OTE) to a destination telephony endpoint (TE). This logic may be embodied in the destination TE, the telecommunications server serving the destination TE, or both. In some embodiments, the logic may determine a unique identifier associated with the OTE. In some such embodiments, the logic may then determine the OTE unique identifier associated with a context based routing policy. For example, the unique identifier may be a telephone number, an IP address, a unique device identifier, etc. In various embodiments, the logic may identify a set of destination TE parameters associated with the destination TE. In one or more embodiments, the logic may identify one or more STEs to invite the join the call based on the context based routing policy. In one or more such embodiments, the logic may provide one or more options for inviting the STEs to join the call.

Some challenges facing call routing for groups include the lack of or impractical and inefficient techniques to bridge others into a call. For instance, call forwarding may allow a user to redirect an incoming call to another number, but typically eliminates the call to the original number. Some systems may include conferencing that allows a user to bridge others into a call, however, it is a laborious and manually intensive process. For example, a user may need to enter conferencing mode, find a contact or enter another number, and hit join. Adding further complexity, as more users cord cut away from home telephones (i.e., landlines) and migrate to cellular only, some capabilities of a multiple extension home line are no longer available. These and other factors may result in mobile telecommunications devices (MTDs) that lack call routing for groups, or include call routing for groups with poor performance and limited adaptability. Such limitations can drastically reduce the performance and usability of MTDs.

Various embodiments described herein include a connection manager that is able to intuitively provide one or more enhanced call routing features for groups. The connection manager may be implemented on a telecommunications server or on the destination TE. For instance, when a MTD receives an incoming call from an OTE associated with a known number (e.g., in a contacts database), the connection manager may automatically associate multiple other STEs with the call based on a routing policy and cause the telecommunications server to invite one or more of the STEs to join the call. For example, when grandma calls mom, the connection manager in mom's MTD may determine that mom has set a routing policy that routes the call to the following STEs: dad's MTD, the kids' MTDs, and the house landline. In some embodiments, a user may be able to define and/or tailor the routing policies. For instance, mom may define the routing policy in the above example via an application on her MTD that may also be uploaded to the telecommunications server. In various embodiments, applicability of one or more of the routing policies may be based on a current context of each STE such as its time and/or location. For example, when grandma calls mom during school hours, the kids may not be invited to join the call. In these and other ways the connection manager may enable intuitive, quick, and efficient techniques for enhanced call routing for groups to achieve better performing and more dynamic capabilities to MTDs, resulting in several technical effects and advantages.

As used herein, the term "communication session" may refer to any one-way or two-way exchange of information between two or more communication devices or telephony endpoints (e.g., MTDs OTE 102, destination TE 106, and/or STEs 108-1, 108-2, or 108-$n$). Communication sessions may include voice, data, video, and multimedia communication sessions, or any other type of data communication sessions or messaging exchanges, such as in a call.

As used herein, the term "communication device" or "telecommunication device" may refer to traditional telephony endpoints, such as one or more of a cellular phone, mobile phone, landline, MTD, OTE, destination TE, STE and the like, as well as non-traditional endpoints such as an accessory device.

As used herein, the term "telephony endpoint" may refer to any wireline or wireless device equipped with a network interface that can utilize one or more networks or protocols associated with telecommunications to place or receive telephony calls. As used herein, the term "communication link" may refer to a physical or logical channel that connects two or more communication devices. In some embodiments, a communication link may be a signaling link or a media link. In various embodiments, a communication session may be established via one or more communication links. In various such embodiments, one or more media streams may be transmitted over the one or more communication links. In some embodiments, a telecommunications server may be situated between communication devices thereby making the telecommunications server an endpoint in a communication link of one or more communication links that establish a communication session. In some such embodiments, the telecommunications server may be hosted within an IP network such as, for instance, the Internet or a LAN/WAN accessible to the Internet.

Therefore, references herein to a communication device or telephony endpoint capable of connecting to or communicating, such as via a mobile carrier network, may refer to a communication device equipped with a cellular transceiver for wireless communication with base stations and other mobile carrier network access points. Similarly, references herein to a communication device or telephony endpoint capable of connecting to or communicating via a data network may refer to a communication device equipped with a transceiver or other network interface for wireless communication (e.g., 802.11) with a router or other data network access point. One particular communication device may be characterized herein as a mobile telecommunications device (MTD). A MTD may include multiple RF transceivers, one of which may be operable to connect to an access network for a mobile carrier network (e.g., cellular network) using either or both of a circuit-switched protocol or an IP protocol and another of which may be operable to connect to an access network for an IP data network (e.g., 802.11) such as the Internet. In various embodiments, one or more of an OTE, destination TE, or STE may be a mobile device.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 illustrates an embodiment of an operating environment 100 that may be representative of various embodiments. Operating environment 100 may include origination telephony endpoint (OTE) 102, telecommunications server 104, destination telephony endpoint (destination TE) 106, and any number of secondary telephony endpoint(s) (STEs) 108-1, 108-2, 108-$n$. In various embodiments, a call or communication session may be established between OTE 102, destination TE 106, and one or more of STEs 108-1, 108-2, 108-$n$ via telecommunications server 104. In various embodiments described herein, which of the STEs 108-1, 108-2, 108-$n$ included in the call between OTE 102 and destination TE 106 may be determined based on a routing policy associated with that particular OTE 102. In some embodiments, the routing policy may be applied by the telecommunications server 104 or destination TE 106. Embodiments are not limited in this context.

In one or more embodiments, for example, an indication of a call from OTE 102 to destination TE 106 may be received. In one or more such embodiments, a unique identifier of the OTE 102 may be identified. In various embodiments, a routing policy associated with OTE 102 may be identified based on the unique identifier of the OTE 102. In various such embodiments, one or more STEs (e.g., STE 108-1, 108-2, and/or 108-$n$) may be identified to invite to join the call based on the routing policy. In some embodiments, one or more options to invite at least one of the STEs to join the call may be provided. For instance, destination TE 106 may provide one or more options via a graphical user interface (GUI) to select STEs 108 to invite to join the call. In one or more such embodiments, the STEs may be invited to join the call via a text message with a link to join the call. Such a text message may be sent from the destination TE 106 to the STEs 108 by way of telecommunications server 104. In one or more such embodiments, the STEs may be called by the telecommunications server 104. If an STE answers the call from telecommunications server 104, that STE will be joined to the original call.

Figure 2:
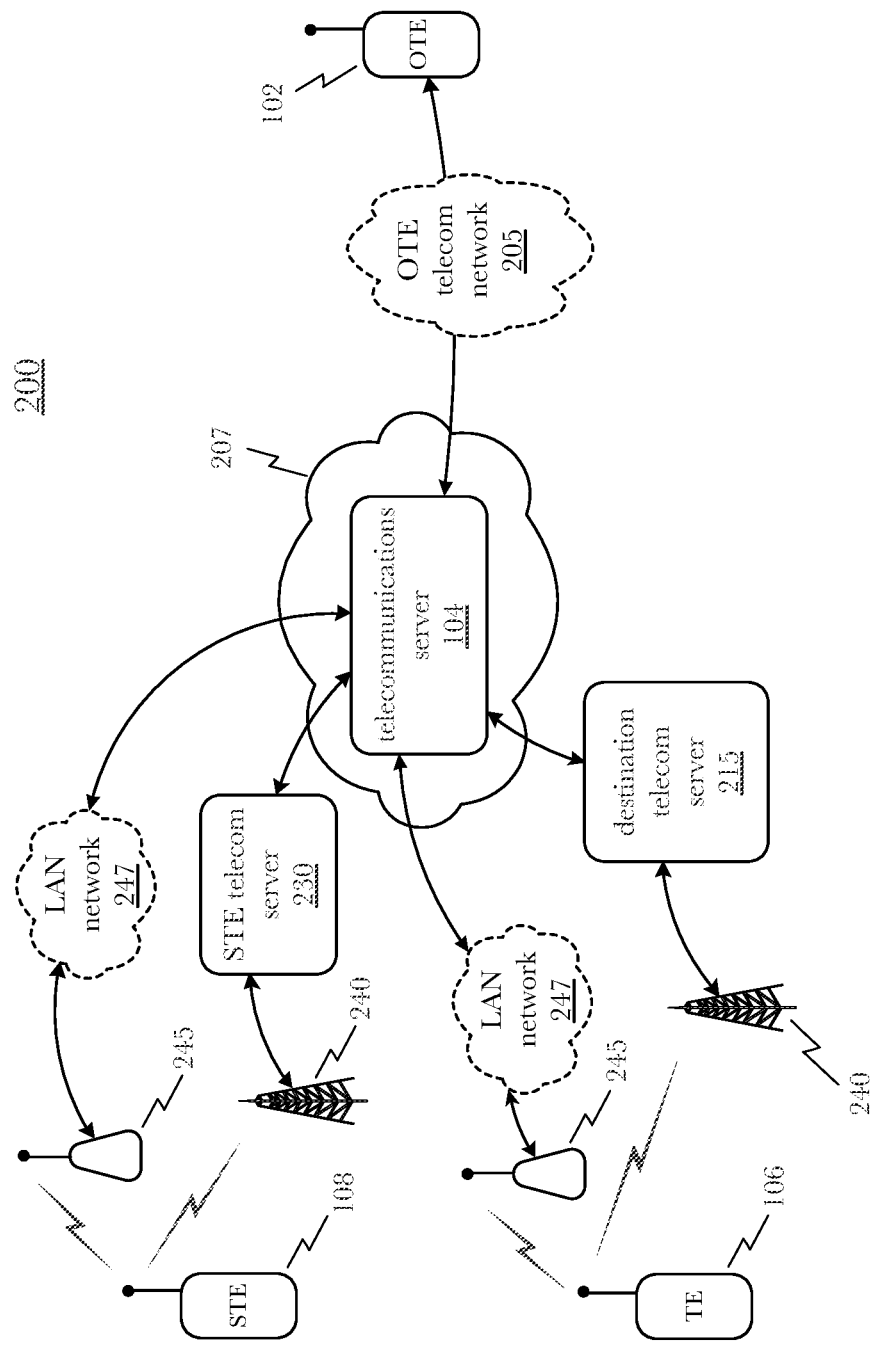
FIG. 2 illustrates an embodiment of a first networked environment for communication among telephony endpoints.

FIG. 2 illustrates an exemplary networked environment for communication between telecommunication devices. In the illustrated embodiment, the telecommunication devices may include OTE 102, destination TE 106, and STE 108. In some embodiments, STE 108 may refer to one or more of STEs 108-1, 108-2, 108-*n*. In various embodiments, OTE 102 may place a call to destination TE 106. OTE 102 may communicate via a telecom network 205 associated with OTE 102. The telecom network 205 associated with OTE 102 may connect with a telecommunications server 104 associated with destination TE 106. The telecommunications server 104 may then communicate with destination TE 106 over one of two paths. The first may be a wireline path from telecommunications server 104 to and through a LAN network 247 to an IP access point 245 followed by a wireless 802.11 WiFi connection to the destination TE 106. The second path may be a wireless path from telecommunications server 104 to and through a mobile destination telecom server 215. The mobile destination telecom server 215 may communicate with destination TE 106 by way of a radio base station 240 to establish a communication session between OTE 102 and destination TE 106. In some embodiments, a routing policy may be utilized to allow or identify STEs 108 to participate in a communication session with OTE 102 and destination TE 106. In some such embodiments, STEs 108 may be identified based on one or more routing policies and a current context, such as time or location. Embodiments are not limited in this context.

In some embodiments, if OTE 102 or destination TE 106 have engaged a routing policy associated with STE 108, the telecommunications server 104 may invite STE 108 to join a call between OTE 102 and destination TE 106. However, it will be appreciated that communication and/or routing between one or more of OTE 102, destination TE 106, and STE 108 may occur in any number of ways without departing from the scope of this disclosure. For instance, OTE 102 may place a call to destination TE 106 via telecommunications server 104. Further, in embodiments with more than one STE (e.g., STE 108-1 and 108-2), different routing paths may be used to connect with different STEs.

As will be described in more detail below, in various embodiments, the destination TE 106 and/or the telecommunications server 104 may maintain or have access to databases that associate OTE 102, destination TE 106, and/or one or more STEs 108-1, 108-2, 108-*n* with one or more routing policies. In some embodiments, the one or more routing policies may be associated with OTE 102 and/or destination TE 106 based on a unique identifier, such as an IP address or telephone number. In various embodiments, OTE 102, destination TE 106, or STE 108 may include one or more RF radios capable of 802.11 WiFi connectivity, cellular circuit-switched connectivity, and/or cellular IP data connectivity.

In one or more embodiments, STE 108 may be invited to join a communications session via an appropriate connection request sent to STE 108 using an appropriate protocol, such as via one or more of STE carrier telecom server 230 or an IP access point 245. In some embodiments, the telecommunications server 104 may determine a registration status of STE 108. In some such embodiments, if the STE 108 is currently registered as active or on-line within the telecommunications server 104, an appropriate connection request may be sent to STE 108 using the appropriate protocol. In various embodiments, the appropriate protocol may be session initiated protocol (SIP) based communications for IP networks whether over 802.11 WiFi or cellular IP data, cellular voice (e.g., GSM, CDMA, VoLTE) or some other suitable protocol. The STE 108 may then accept the connection request to establish a media channel (e.g., voice channel) with telecommunications server 104. The telecommunications server 104 in turn may join the STE 108 into a call with OTE 102 and destination TE 106.

The networked or operating environments shown in FIGS. 1, 2, and 3 may include multiple distinct interconnected networks and/or servers such as, for instance, a large-scale internet protocol (IP) network (e.g., the Internet) and any associated access points, mobile carrier network servers, and the telecom network(s) of one or more telephony endpoint devices. The telecom network(s) of the telephony endpoint devices may include any combination of the PSTN, an IP network, or a mobile carrier network depending the type of the telephony endpoint devices. While these distinct networks may utilize different protocols and signaling schemes, there are various interfaces that allow for the seamless transition of signaling, voice, and data (including text, audio, and video) such that various communication endpoints may communicate with one another over one or more of these inter-connected networks. In one or more embodiments, for simplicity, the multiple distinct inter-connected networks and/or servers may be collectively referred to by telecommunications server 104. Embodiments are not limited in this context.

The PSTN may be characterized as a circuit switched point-to-point communications network in which a physical connection between the endpoints is maintained for the duration of the connection. The PSTN may also be referred to as the legacy telephone network as it is the backbone infrastructure for connecting endpoints comprised of POTS phones.

Mobile carrier networks (sometimes referred to as cellular networks) may come in different varieties based on the radio transmission scheme between a communication device known as a wireless handset (e.g., some OTEs 102, destination TE 106, or some STEs 108-1, 108-2, 108-*n*) and the mobile carrier network base station that is in communication with the wireless handset. Two such circuit-switched radio transmission schemes are the GSM and CDMA. These radio transmission schemes are incompatible with one another necessitating an intervening interface to allow communication between endpoints on either network. In addition, each network may operate over specific frequency ranges. Often, there may even be an intervening network such as the PSTN between two distinct mobile carrier networks. Each mobile carrier network may include an interface to the PSTN such that calls crossing that interface can be handled by the receiving network whether it is a mobile carrier network or the PSTN.

Mobile carrier networks also may utilize cellular radio based IP data transmission protocols such as, for instance, LTE. There are numerous cellular radio based IP data transmission protocols in existence that are different from one another with one key similarity—the ability to send and receive IP data packets. Thus, this disclosure may simply use the term cellular IP data to refer to all of them. Cellular IP data is, however, separate and distinct from circuit-switched cellular for voice.

Various mobile carrier network operators may base their network on one of the radio transmission schemes and provide service to wireless handsets (e.g., OTE 102, destination TE 106, or STEs 108-1, 108-2, 108-$n$) using that radio transmission scheme over a defined frequency band. For example, a wireless handset may wirelessly communicate with a base station that serves as an access network to the mobile carrier network. The base station may authenticate and authorize the wireless handset to the mobile carrier network and, in conjunction with other equipment within the mobile carrier network, manage calls to and from the wireless handset and may include or implement one or more routing policies described herein. In various embodiments, a destination TE 106 may include or implement one or more routing policies described herein. In still other embodiments, a combination telecommunications server 104 and/or destination TE 106 may include or implement one or more routing policies described herein. In some embodiments, the routing policies may be performed based on one or more settings of or actions by the wireless handset.

The mobile carrier network may provide connectivity for any wireless handsets (e.g., one or more of OTE 102, destination TE 106, STE 108) capable of cellular transmission that are physically located within range of the mobile carrier network. The range of a mobile carrier network may depend, in part, on an amplification, power, and/or energy associated with the antennas comprising cellular base station, wireless handsets and the like. As the wireless handset moves toward the outer range of the mobile carrier network, the strength of the cellular signals may degrade.

Similarly, an IP based data network may provide wireless connectivity to wireless handsets, such as destination TE 106 or STEs 108 within range of an IP access point 245. For instance, IP access point 245 may provide wireless connectivity using any of the 802.11 WiFi standards, WiMAX standards, and/or any other type of IP based connectivity standard.

The collection of IP based data networks that all run on the IP packet based data transfer protocol may be characterized as packet switching networks. Packet switching may essentially chop up a data stream (e.g., text, voice, data) into segments and transfer them across an IP network to a destination where the packets are re-assembled into the original data stream for output. Voice over IP (VoIP) is a specialized subset of IP packet based communication directed to IP telephony. VoIP communication devices may utilize an IP access point (e.g., IP access point 245) to communicatively couple with the larger IP network. The IP access point may be wired, wireless (e.g., WiFi), or a combination wired/wireless access point. A VoIP telephony endpoint may communicate with an IP access point to gain access to the larger IP network and other communication devices.

In various embodiments, there is one aspect that each network (e.g., PSTN, VoIP, and mobile carrier) has in common that facilitates communication sessions among communication devices native to the various networks. In various such embodiments, the commonality may be that each communication device has a unique identifier associated with it, such as a telephone number (TN) or an IP address. The format of each type of identifier may be identical regardless of the network in use. For example, in North America, a TN is a ten-digit number. Communication devices in North America is associated with a 10-digit telephone number that subscribers 'dial' to reach other subscribers no matter the network the other subscriber uses. In various embodiments described herein, a TN may be used to determine an IP address associated with a communications device. Thus, users of communication devices may not need to worry about how to reach another user because communication devices can key off an associated telephone number. From the user's perspective, the networks may resolve any connection issues and enable calls to be connected so that a communication session may occur.

FIG. 3 illustrates an embodiment of an operating environment 300, which may be representative of various embodiments. Operating environment 300 may include OTE 102, telecommunications server 104, destination TE 106, and STE 108. In operating environment 300, OTE 102 may include user interface 306 and network interface 304, while destination TE 106 may include user interface 318 and network interface 316. Further, operating environment 300 may include one or more connection managers (e.g., connection managers 310, 320). In various embodiments, these connection managers may be responsible for implementing the routing policies described herein. Embodiments are not limited in this context.

Connection manager 310, 320 may be embodied in telecommunications server 104 and/or destination TE 106. Connection manager 310, 320 may enable a user, such as via user interface 318 to define or modify one or more routing policies. In various embodiments, connection manager 310, 320 may utilize a unique identifier of OTE 102 to identify one or more STEs 108 to invite to join a call.

In various embodiments, network interfaces 304, 316 may enable OTE 102 and destination TE 106 to engage in telecommunications, such as via telecommunications server 104. In some embodiments, user interfaces 306, 318 may enable OTE 102 and destination TE 106 to communicate and/or receive information from a user. For instance, user interface 318 may include a graphical user interface (GUI) that enables a user to device parameters implement, define, or modify one or more routing policies. In another example, one or more options to invite one or more STEs to join a call may be provided via the user interface. In yet another example, user interface 318 may enable a user to dial a telephone number.

Included herein is a set of flow charts and message diagrams representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The logic flows herein may be representative of some or all of the operations executed by one or more embodiments described herein. Further, the logic flows may be performed by circuitry embodied on one or more components discussed herein, such as telecommunications server 104 and destination TE 106. Moreover, any given logic flow may be performed in conjunction with one or more other logic flows discussed herein. Embodiments are not limited in this context.

FIGS. 4A-4D illustrate embodiments for receiving a call and routing it to STEs provided circumstances warrant such action. In FIG. 4A, the logic flow 400A describes a process of receiving and routing calls using the connection manager 320 embodied in the destination TE 106. The destination TE 106 receives and indication of an incoming telephone call placed from an OTE 102 at step 410A. The indication may be, for instance, an audible ring or a silent vibration along with an optional display of a form of caller ID. The connection manager 320 may identify (or receive an identification of) a unique identifier associated with the OTE 102 at step 420A. The unique identifier may be, for instance, the telephone number of the OTE 102 making the call. Other identifiers such as IP addresses may be used depending on the type of device making the call as well as the networks and protocols used to make the call. Once the OTE 102 has been identified, it is determined whether it is associated with a routing policy at decision step 430A. If the OTE 102 unique identifier is not associated with a routing policy, the process terminates at step 440A and the incoming call may be answered on the destination TE 106 without application of a routing policy. Otherwise, if there is a routing policy associated with the OTE 102 unique identifier, the connection manager 320 may identify any STE 108 identifiers associated with the routing policy at step 450A.

This typically involves determining if there are one or more contacts within a contact database 330 on the destination TE 106 that are linked with the OTE. For example, the OTE 102 identifier may be the telephone number for Grandma. The routing policy may link multiple other contacts (and their STE identifiers or telephone numbers) to that number such as, for instance, husband, wife, home phone, and kids phones. Thus, the first step of the routing policy may be to identify the pool of STEs 108 linked with the OTE 102. A next step may be to determine a current context of each STE 108. For instance, the time and location of each STE 108 may be factored into determining whether to invite that STE 108 to join the call. Consider a call occurring at 1:45 PM. Normally this is a time that the kids are in school so their STE's 108 may not be invited to join the call under the routing policy. In another scenario, wife's STE 108 may be located at a doctor's office implying it is not a good time for wife to join a call. Thus, the location of the STE 108 may eliminate it from being invited to join the call. Embodiments are not limited in this context.

Once the routing policy has been applied, the destination TE 106 may provide options to invite the candidate STEs 108 to join the call at step 460A. The options may include, for instance, a GUI embodied on a touch screen that lists the STEs 108 that were filtered through the routing policy for that OTE 102. The destination TE 106 user may then select one or more of the STEs 108 presented. The selection process may then lead to an invitation process at step 470A.

In FIG. 4B, the logic flow 400B describes an invite process 470A for joining STEs 108 into the call between OTE 102 and destination TE 106. The destination TE 106 may provide a graphical user interface (GUI) setting out the STEs 108 that fit the routing policy at step 472A. This may entail displaying, on a touchscreen, one or more icons corresponding to contacts fitting the routing policy. The destination TE 106 user may select one or more of the icons representing an STE 108. For example, if Grandma is calling mom, the routing policy may determine that dad's STE 108 and the kids' STEs 108 may be interested in joining the call. Mom may decide to only select dad's STE 108. The destination TE 106 may then process the selections to determine which STEs 108 have been selected at step 474A. Destination TE 106 may then message (or otherwise communicate with) the telecommunications server 104 to cause an invite to be sent to the selected STEs 108 at step 476A. The invite may be similar to the STE 108 receiving an incoming call alert. Alternatively, the invite may be in the form of a text message or pop-up notification containing a link or option that when clicked on informs the telecommunications server 104 the STE 108 does indeed wish to join the call. Telecommunications server 104 may then bridge the accepting STEs 108 into the call between the OTE 102 and destination TE 106 at step 478A.

In FIG. 4C, the logic flow 400C describes a process of receiving and automatically routing calls using the connection manager 320 embodied in the destination TE 106. The destination TE 106 receives and indication of an incoming telephone call placed from an OTE 102 at step 410C. The indication may be, for instance, an audible ring or a silent vibration along with an optional display of a form of caller ID. The connection manager 320 may identify (or receive an identification of) a unique identifier associated with the OTE 102 at step 420C. The unique identifier may be, for instance, the telephone number of the OTE 102 making the call. Other identifiers such as IP addresses may be used depending on the type of device making the call as well as the networks and protocols used to make the call. Once the OTE 102 has been identified, it is determined whether it is associated with a routing policy at decision step 430C. If the OTE 102 unique identifier is not associated with a routing policy, the process terminates at step 440C and the incoming call may be answered on the destination TE 106 without application of a routing policy. Otherwise, if there is a routing policy associated with the OTE 102 unique identifier, the connection manager 320 may identify any STE 108 identifiers associated with the routing policy at step 450C.

Once the routing policy has been applied, the destination TE 106 may automatically invite the candidate STEs 108 that made it through the routing policy filter to join the call at step 460C.

In FIG. 4D, the logic flow 400D describes an automatic invite process 470C for joining STEs 108 into the call between OTE 102 and destination TE 106. Destination TE 106 may automatically message (or otherwise communicate with) the telecommunications server 104 to cause an invite to be sent to the STEs 108 filtered by the routing policy at step 472C. The invite may be similar to the STE 108 receiving an incoming call alert. Alternatively, the invite may be in the form of a text message or pop-up notification containing a link or option that when clicked on informs the telecommunications server 104 the STE 108 does indeed wish to join the call. Telecommunications server 104 may then bridge the accepting STEs 108 into the call between the OTE 102 and destination TE 106 at step 474C.

FIGS. 5A-5B illustrate embodiments for receiving a call and routing it to STEs provided circumstances warrant such action. In FIG. 5A, the logic flow 500A describes a process of receiving and routing calls using the connection manager 310 embodied in the telecommunications server 104. The telecommunications server 104 receives and indication of an incoming telephone call placed from an OTE 102 at step 510A. The indication may be, for instance, an audible ring or a silent vibration along with an optional display of a form of caller ID. The connection manager 310 may identify (or receive an identification of) a unique identifier associated with the OTE 102 at step 520A. The unique identifier may be, for instance, the telephone number of the OTE 102 making the call. Other identifiers such as IP addresses may be used depending on the type of device making the call as well as the networks and protocols used to make the call. Once the OTE 102 has been identified, it is determined whether it is associated with a routing policy at decision step 530A. Telecommunications server 104 may have a cloud based copy of the contact database of destination TE 106. If the OTE 102 unique identifier is not associated with a routing policy, the process terminates at step 540A and the incoming call may be answered on the destination TE 106 without application of a routing policy. Otherwise, if there is a routing policy associated with the OTE 102 unique identifier, the connection manager 310 may identify any STE 108 identifiers associated with the routing policy at step 550A.

This typically involves determining if there are one or more contacts within a contact database 340 in the telecommunications server 104 that are linked with the OTE. For example, the OTE 102 identifier may be the telephone number for Grandma. The routing policy may link multiple other contacts (and their STE identifiers or telephone numbers) to that number such as, for instance, husband, wife, home phone, and kids phones. Thus, the first step of the routing policy may be to identify the pool of STEs 108 linked with the OTE 102. A next step may be to determine a current context of each STE 108. For instance, the time and location of each STE 108 may be factored into determining whether to invite that STE 108 to join the call. Consider a call occurring at 1:45 PM. Normally this is a time that the kids are in school so their STE's 108 may not be invited to join the call under the routing policy. In another scenario, wife's STE 108 may be located at a doctor's office implying it is not a good time for wife to join a call. Thus, the location of the STE 108 may eliminate it from being invited to join the call. Embodiments are not limited in this context.

Once the routing policy has been applied, the telecommunications server 104 may provide the destination TE 106 with options to invite the candidate STEs 108 to join the call at step 560A. The options may include, for instance, a GUI embodied on a touch screen that lists the STEs 108 that were filtered through the routing policy for that OTE 102. The destination TE 106 user may then select one or more of the STEs 108 presented. The selection process may then lead to an invitation process 570A identical to that described in FIG. 4B and is, therefore, not repeated here.

In FIG. 5B, the logic flow 500B describes a process of receiving and automatically routing calls using the connection manager 310 embodied in the telecommunications server 104. The telecommunications server 104 receives and indication of an incoming telephone call placed from an OTE 102 at step 510B. The indication may be, for instance, an audible ring or a silent vibration along with an optional display of a form of caller ID. The connection manager 310 may identify (or receive an identification of) a unique identifier associated with the OTE 102 at step 520B. The unique identifier may be, for instance, the telephone number of the OTE 102 making the call. Other identifiers such as IP addresses may be used depending on the type of device making the call as well as the networks and protocols used to make the call. Once the OTE 102 has been identified, it is determined whether it is associated with a routing policy at decision step 530B. If the OTE 102 unique identifier is not associated with a routing policy, the process terminates at step 540B and the incoming call may be answered on the destination TE 106 without application of a routing policy. Otherwise, if there is a routing policy associated with the OTE 102 unique identifier, the connection manager 310 may identify any STE 108 identifiers associated with the routing policy at step 550B.

Once the routing policy has been applied, the telecommunications server 104 may automatically invite the candidate STEs 108 that made it through the routing policy filter to join the call at step 560B. The invitation process 570B may be identical to that described in FIG. 4D and is, therefore, not repeated here.

In one or more embodiments, one or more routing policies may be defined and/or implemented to achieve one or more of the following examples or embodiments. In some embodiments, when a mobile phone receives an incoming call from a known number, multiple other telephone numbers (cellular and/or landline) may be associated with the call, and each one may be invited to join the call. For example, when grandma calls mom (i.e., communications device associated with grandma calls MTD associated with mom, a routing policy may be identified that provides: when 555-555-5555 is the caller ID, please invite all of the following numbers in addition to the actual called number. These additional number may include communication devices associated with dad, the house (e.g., landline), and the kids.

In various embodiments, the routing policies may be further tailored, such as with respect to a current context. For instance, the kids will not be invited to join the call between 8:00 am and 3:30 pm (when the kids are in school). In another instance, when dad is located at work (i.e., MTD associated with dad), do not invite him to join the call. In some embodiments, one or more routing policies may cause an alert, such as a text message, to be sent to the additional phones. For instance, the text message may be an alert to dad that grandma called mom. In one or more embodiments, the alert may include a link that when clicked allows dad to join the call. Further, when the target communications device of an alert is turned off or does not have service, the alert may be queued for delivery as soon as a connection with the device is reestablished.

In one or more embodiments, mom's MTD may recognize grandma's number and upon connecting, present multiple icons, such as via user interface 318, for contacts associated with mom and grandma to add to the call. In one or more such embodiments, instead of automatically ringing the additional numbers, mom can simply press one of the icons to invite that person to join the call.

Figure 6:
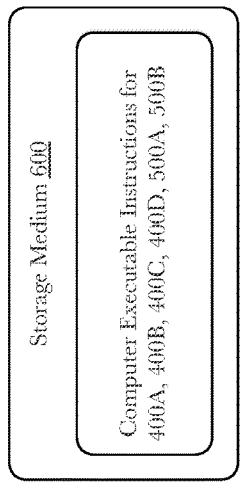
FIG. 6 illustrates an embodiment of a storage medium.

FIG. 6 illustrates an embodiment of a storage medium 600. Storage medium 600 may comprise any non-transitory computer-readable storage medium or machine-readable storage medium, such as an optical, magnetic or semiconductor storage medium. In various embodiments, storage medium 600 may comprise an article of manufacture. In some embodiments, storage medium 600 may store computer-executable instructions, such as computer-executable instructions to implement one or more of logic flows or operations described herein, such as with respect to FIGS. 4A, 4B, 4C, 4D, 5A and 5B. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 7:
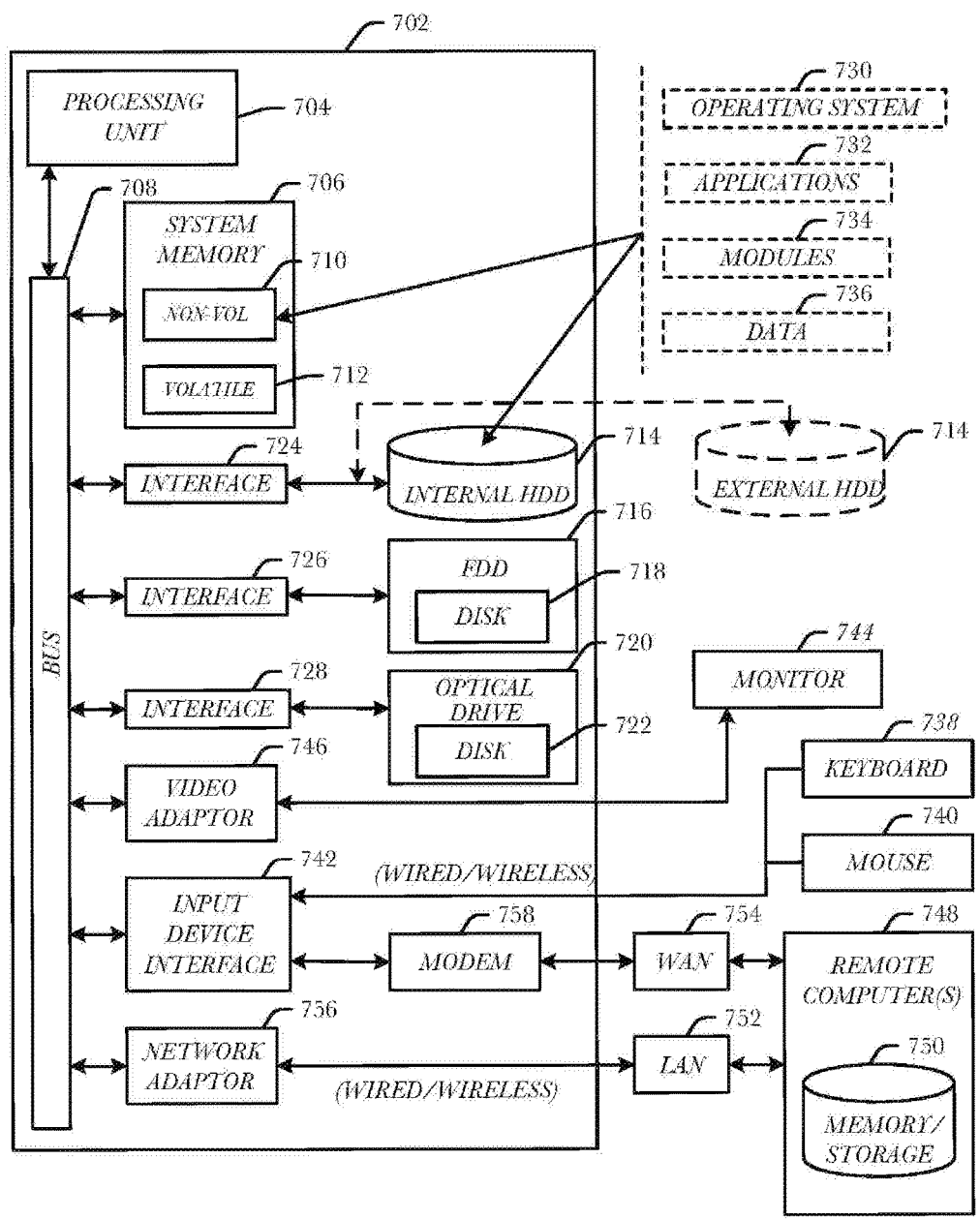
FIG. 7 illustrates an embodiment of a computing architecture.

FIG. 7 illustrates an embodiment of an exemplary computing architecture 700 that may be suitable for implementing various embodiments as previously described. In various embodiments, the computing architecture 700 may comprise or be implemented as part of an electronic device. In some embodiments, the computing architecture 700 may be representative, for example, of one or more of OTE 102, telecommunications server 104, destination TE 106, or STEs 108-1, 108-2, 108-n. In some embodiments, computing architecture 700 may be representative, for example, of a computing device that implements one or more components of connection manager 310, 320. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 994 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of one or more of OTE 102, telecommunications server 104, destination TE 106, or STEs 108-1, 108-2, 108-n.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 994 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
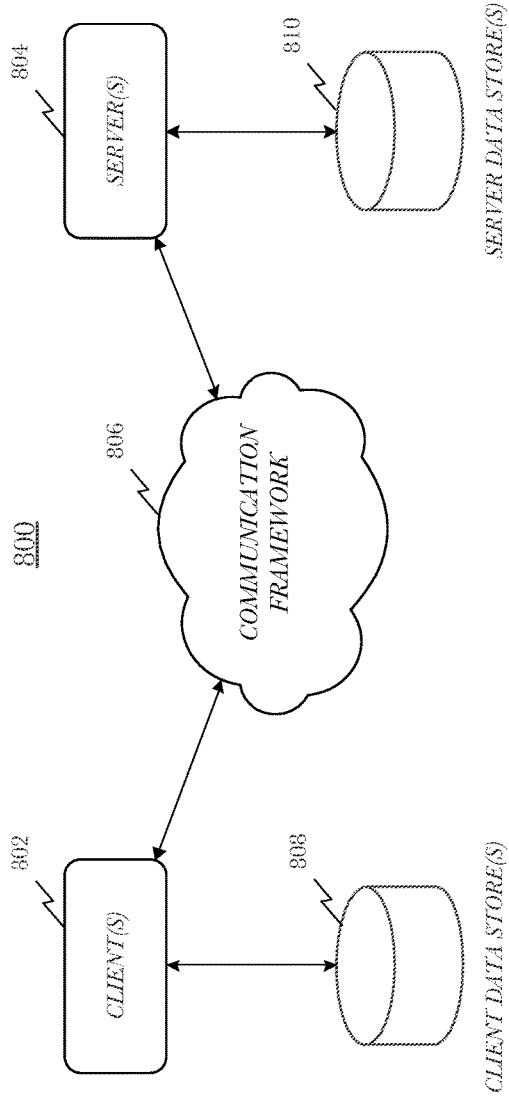
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 comprises includes one or more clients 802 and servers 804. The clients 802 and the servers 804 are operatively connected to one or more respective client data stores 808 and server data stores 810 that can be employed to store information local to the respective clients 802 and servers 804, such as cookies and/or associated contextual information. In various embodiments, any one of servers 804 may implement one or more of logic flows or operations described herein, and storage medium 600 of FIG. 6 in conjunction with storage of data received from any one of clients 802 on any of server data stores 810.

The clients 802 and the servers 804 may communicate information between each other using a communication framework 806. The communications framework 806 may implement any well-known communications techniques and protocols. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. A mobile device telephony endpoint (TE) apparatus, comprising:
a memory; and
logic, at least a portion of which is implemented in circuitry coupled to the memory, the logic to:
receive an indication of an incoming call from an origination telephony endpoint (OTE);
identify a unique identifier associated with the OTE;
based on the unique identifier associated with the OTE for the incoming call, determine one or more secondary telephony endpoints (STEs) that the TE can invite to join the call;
provide an option to the user of the TE to invite at least one of the one or more of the STEs to join the call;
determine which STEs are selected to join the call;
determine a current context for the selected STEs;
use the current context to determine whether to invite the one or more STEs to join the call, the current context comprising one of whether the time of the incoming call is determined to be not suitable for that STE to join the incoming call or whether the STE is determined to be at location not suitable for that STE to join the incoming call; and
send an invitation to the selected STEs to join the call, the invitation comprising one of a text message identifying the calling and called parties and containing a link to join the call or a pop-up notification identifying the calling and called parties and containing a link to join the call.

2. The apparatus of claim 1, wherein the logic to provide the option to invite at least one of the one or more STEs to join the call is an icon on a touchscreen GUI of the TE.

3. The apparatus of claim 1, the unique identifier associated with the OTE comprising a telephone number.

4. The apparatus of claim 1, the OTE telephone number associated with a unique identifier of the STEs.

5. The apparatus of claim 4, wherein the unique identifier of the STEs is a telephone number.

6. A computer-implemented method embodied in a mobile device telephony endpoint (TE), comprising:
receiving an indication of an incoming call from an origination telephony endpoint (OTE);
identifying a unique identifier associated with the OTE;
based on the unique identifier associated with the OTE for the incoming call, determining one or more secondary telephony endpoints (STEs) that the TE can invite to join the call;
providing an option to the user of the TE to invite at least one of the one or more of the STEs to join the call;
determine which STEs are selected to join the call;
determining a current context for the selected STEs;
using the current context to determine whether to invite the one or more STEs to join the call, the current context comprising one of whether the time of the incoming call is determined to be not suitable for that STE to join the incoming call or whether the STE is determined to be at location not suitable for that STE to join the incoming call; and
sending an invitation to the selected STEs to join the call, the invitation comprising one of a text message identifying the calling and called parties and containing a link to join the call or a pop-up notification identifying the calling and called parties and containing a link to join the call.

7. The computer-implemented method of claim 6, further comprising:

providing an icon on a touchscreen GUI of the TE to invite at least one of the one or more STEs to join the call.

8. The computer-implemented method of claim 6, the unique identifier associated with the OTE comprising a telephone number.

9. The computer-implemented method of claim 6, the OTE telephone number associated with a unique identifier of the STEs.

10. The computer-implemented method of claim 9, wherein the unique identifier of the STEs is a telephone number.

11. At least one non-transitory computer-readable medium comprising a set of instructions that, in response to being executed by a processor circuit embodied in a mobile device telephony endpoint, cause the processor circuit to:
   receive an indication of an incoming call from an origination telephony endpoint (OTE);
   identify a unique identifier associated with the OTE;
   based on the unique identifier associated with the OTE for the incoming call, determine one or more secondary telephony endpoints (STEs) that the TE can invite to join the call;
   provide an option to the user of the TE to invite at least one of the one or more of the STEs to join the call;
   determine which STEs are selected to join the call;
   determine a current context for the selected STEs;
   use the current context to determine whether to invite the one or more STEs to join the call, the current context comprising one of whether the time of the incoming call is determined to be not suitable for that STE to join the incoming call or whether the STE is determined to be at location not suitable for that STE to join the incoming call; and
   send an invitation to the selected STEs to join the call, the invitation comprising one of a text message identifying the calling and called parties and containing a link to join the call or a pop-up notification identifying the calling and called parties and containing a link to join the call.

12. The at least one non-transitory computer-readable medium of claim 11, comprising instructions that, in response to being executed by the processor circuit, cause the processor circuit to:
   provide an icon on a touchscreen GUI of the TE to invite at least one of the one or more STEs to join the call.

* * * * *